ENCODING DEVICE

Filed Nov. 9, 1962 3 Sheets-Sheet 1

INVENTOR.
RAYMOND H. DEVANNEY

BY Lindsey, Prutzman and Hayes
ATTORNEYS

Aug. 9, 1966 R. H. DEVANNEY 3,265,868

ENCODING DEVICE

Filed Nov. 9, 1962 3 Sheets-Sheet 2

INVENTOR.
RAYMOND H. DEVANNEY

BY Lindsey, Prutzman and Hayes

ATTORNEYS

Aug. 9, 1966 R. H. DEVANNEY 3,265,868

ENCODING DEVICE

Filed Nov. 9, 1962 3 Sheets-Sheet 3

INVENTOR.
RAYMOND H. DEVANNEY
BY Lindsey, Prutzman and Hayes
ATTORNEYS

United States Patent Office 3,265,868
Patented August 9, 1966

3,265,868
ENCODING DEVICE

Raymond H. Devanney, Berlin, Conn., assignor to Veeder-Root Incorporated, Hartford, Conn., a corporation of Connecticut Filed Nov. 9, 1962, Ser. No. 236,560
14 Claims. (Cl. 235—92)

The present invention relates to encoding devices for translating data registered by mechanical displacement into an electrical code equivalent and is concerned more particularly with encoding devices adapted for encoding data capable of being expressed with a numeral as by a conventional rotary counter.

It is a principal aim of the present invention to provide an encoding device of the type described which is adapted to provide separate electrical code equivalents for a large number of discrete units of data having a repeating sequence, as for example, the numerals displayed by a conventional rotary counter. This aim includes having the encoding device maintain synchronization between the code and the corresponding discrete units of data during and after a transition from the last unit of a prior sequence to the first unit of the next sequence. For example, the data could be the numbers of 0 through some multiple of ten, such as 10,000, capable of being displayed on a mechanically actuated counter by 0000, 0001 . . . 9998, 9999, 0000, a repeating sequence. This data would be represented by a number of electrical code equivalents equal to the number of numerals, or less than that number where each code is the equivalent of two or more consecutive numerals, and the code sequence would repeat in synchronization with the repetition of the numeral sequence.

It is another aim of this invention to provide an encoding device including a rotary counter producing a visual readout, for translating the counter readout into an electrical code equivalent that remains constant through successive repetitions of the counter irrespective of the number of places used in the readout and whether the counter be operated forwardly or in reverse.

It is still another aim of this invention to provide an enoding device for translating the numerals presented by a conventional rotary counter into a straight binary code and mechanically synchronize the counter and binary code through continuous operation of the counter.

It is a further aim to provide an improved encoding device of the type described which can be compactly constructed into an assembly capable of withstanding shock and vibration and which is reliable during long usage and high-speed operation.

Other aims will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

The present invention is based on the concept that the number of discrete units of data to be translated into electrical code equivalents may be different than the number of codes capable of being sequentially provided by a mechanical and electrical encoding system. For example, a binary encoding system provides a number of binary electrical codes in accordance with a geometric progression beginning with two and progressively increasing by a factor of 2; i.e., a single-wire binary system will provide two binary codes, a three-wire system will provide eight ($2^3$) codes, a twelve-wire binary system will provide 4,096 ($2^{12}$) binary codes, and a thirteen-wire binary system will provide 8,192 ($2^{13}$) binary codes. Therefore, as by way of example, if a sequence of five thousand discrete units of data are to be converted into a binary code, the minimum number of wires necessary are thirteen, such providing an excess of 3,192 binary codes. Consequently, when repeating the sequence of units of data, it becomes necessary to erase the available excess of binary codes and reset the binary code sequence at its initial code in order to maintain the code equivalents constant through repetitions of the data sequence.

In order that the mode of operation of the encoding device of this invention can be more easily understood, the device will first be described generally with reference to the diagram of FIG. 1 and then more specifically with reference to the remaining figures illustrating the hardware of an embodiment of the diagram.

Figure 1:
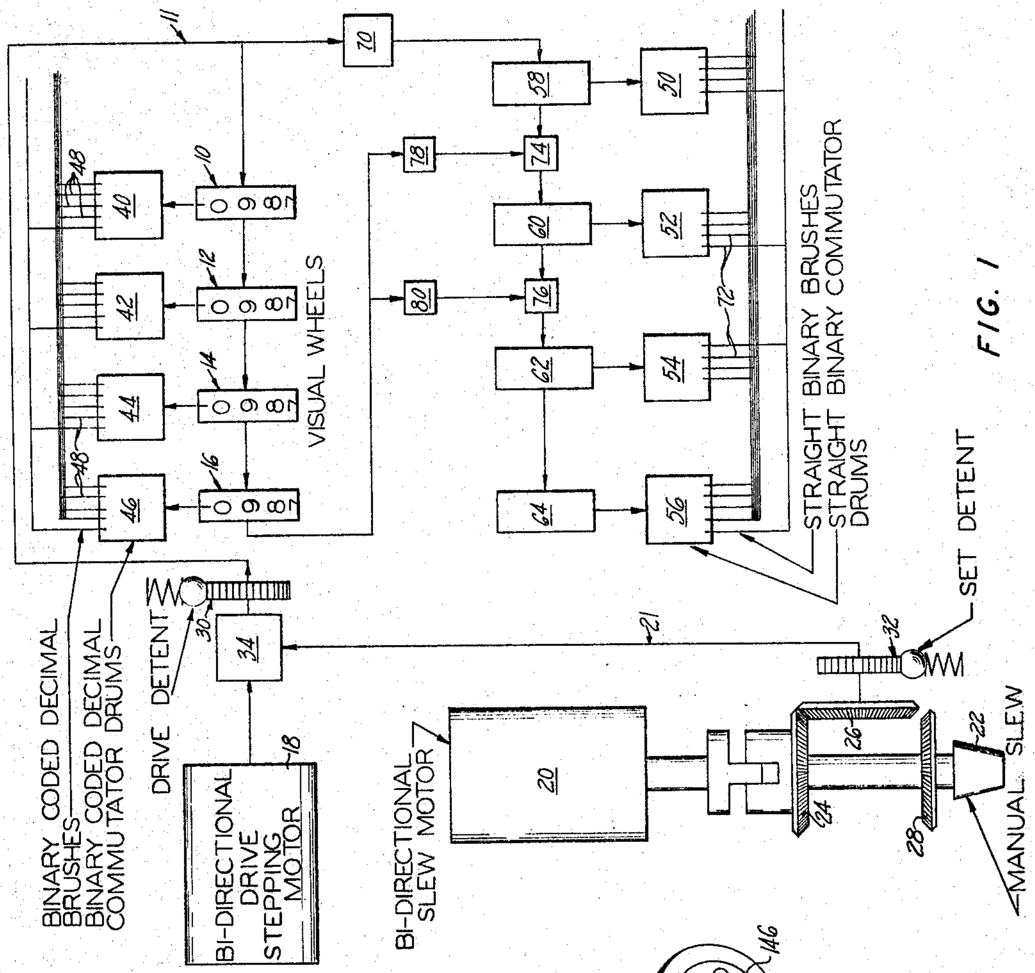
FIG. 1 is a diagrammatic representation of an encoding device of the present invention.

As shown in the diagram of FIG. 1, the encoding device may incorporate a conventional rotary counter having a plurality of decade rotary indicators or wheels 10, 12, 14 and 16 with indicia of the integers 0 through 9 on the cylindrical face thereof providing a visual readout in the usual manner. The lowest order decade indicator 10 is operated by a drive 11, and the remaining indicators of higher order are successively advanced through conventional transfer mechanisms to provide a visual readout sequence of numerals of 0000, 0001 . . . 9999, 0000, 0001, etc. The counter drive 11 is driven either by a bi-directional stepping motor 18 capable of being automatically controlled by means not shown, or by a manual slew system comprising a bi-directional slew motor 20 and a slew knob 22. Bevel gearing 24 and 26 are normally in engagement to connect the slew motor 20 with an intermediate drive 21; however, manual slewing by the knob 22 is readily accomplished by depressing the knob 22 to move a bevel gear 28 into engagement with the gear 26 and to disengage the bevel gear 24. The stepping motor 18 and the manual slew can individually or simultaneously drive through a differential 34, the counter drive 11, with the detents 30 and 32 acting to hold respectively the drive 11 and the manual slew during deactivation thereof with the number on the decade wheel 10 properly aligned for visual reference. Consequently, the counter can be manually set or calibrated or automatically controlled in accordance with the requisites of any specific application as, for example, where the counter device is used to present navigational data and a controller initially sets the counter for subsequent automatic control.

A binary code decimal equivalent, i.e. an independent code for the numerals of each place or rotary indicator, is provided by a plurality of binary coded rotary commutators 40, 42, 44 and 46 that are respectively advanced with the advancement of the rotary indicators 10, 12, 14 and 16. The selected binary code is picked up by commutator brushes 48, there being for a counter wheel having ten digits five brushes 48 in contact with its associated commutator. One of the five brushes provides a common and the remaining four brushes transmit the binary code. As an alternative to this commutator and brush arrangement, there could be provided a plurality of stationary electrical contacts, one for each indicia of the counter wheel, successively energized by a contact movable in cooperation with its respective rotary indicator. The stationary contacts would be connected to a conventional matrix to encode the readout of the indicators. Thus with either alternative an electrical readout means is provided for transmitting electrical signals in accordance with the decimal binary system.

Straight or nondecimal binary code equivalents, i.e. code equivalents varying in accordance with a continuous pattern not related to the indicia of each counter indicator, are provided by a plurality of binary coded rotary commutators 50, 52, 54 and 56, each having a plurality of discrete rotational positions, operatively connected to and advanced with the rotary elements 58, 60, 62 and 64, respectively. The rotary element 58 is advanced in cooperation with the advancement of the rotary indicator 10, and conventional transfer mechanisms are located between the rotary elements for advancing the rotary elements 60, 62, and 64. The straight binary coding may provide a binary code for each numeral between 1 and 10,000, the range of the rotary counter; however, in the present embodiment a binary code is provided for each two successive numerals therefore necessitating only 5,000 binary codes for the entire sequence of 10,000 numerals. The straight binary codes will represent the count by twos by properly correlating the codes in connecting equipment. Accordingly, the rotary element 58 and the commutator 50 are advanced one discrete position with the advancement of the rotary indicator 10 through two numerals, a ratio of 1:2. A transmission 70 operatively connecting the drive 11 which the rotary element 58 provides the desired 1:2 ratio and preferably additionally incorporates an interrupted drive mechanism to preclude code ambiguity.

The commutators 50, 52 and 54 and the corresponding rotary elements 58, 60 and 62 have eight discrete positions, and the highest order commutator 56 and its corresponding rotary element 64 have ten discrete positions, thereby providing 5,120 ($8 \times 8 \times 8 \times 10$) distinct coding positions, an excess of 120 over the necessary 5,000. Like the binary decimal encoding, a plurality of brushes 72 in electrical cooperation with the binary commutators 50, 52, 54, 56 provide the leads for the code output, or, alternatively, as with the binary decimal encoding, a code pickup could be provided by stationary contacts electrically connected to a matrix and successively energized by a contact advanced with the rotary elements 58, 60, 62 and 64.

For insuring that the binary commutators 50, 52, 54 and 56 move to their initial discrete positions with the advancement of the counter through 9999 to 0000 thereby erasing the excess codes, a corrective and supplemental movement of the rotary elements 60, 62, and 64 must be provided. The need for corrective indexing of the binary commutators may be more easily understood upon reference to the following table showing the counter numerals, the corresponding binary code equivalents and the discrete positions of the binary commutators:

| Counter Numerals | Straight Binary Code Equivalents | | | | Discrete Position of Commutator | | | |
|---|---|---|---|---|---|---|---|---|
| | | | | | Decade Wheel | | Octal Wheels | |
| | | | | | 56 | 54 | 52 | 50 |
| 9997 | 1001 | 110 | 000 | 110 | 10th | 7th | 1st | 7th |
| 9998 | 1001 | 110 | 000 | 111 | 10th | 7th | 1st | 8th |
| 9999 | 1001 | 110 | 000 | 111 | 10th | 7th | 1st | 8th |
| 0000 | 0000 | 000 | 000 | 000 | 1st | 1st | 1st | 1st |
| 0001 | 0000 | 000 | 000 | 000 | 1st | 1st | 1st | 1st |
| 0002 | 0000 | 000 | 000 | 001 | 1st | 1st | 1st | 2nd |
| 0003 | 0000 | 000 | 000 | 001 | 1st | 1st | 1st | 2nd |
| 0004 | 0000 | 000 | 000 | 010 | 1st | 1st | 1st | 3rd |

It can be seen that upon advancement of the counter through 9999 to 0000, the octal commutator 50 of lowest order should be advanced one discrete position, the second order octal commutator 52 should remain in its former discrete position, the third order octal commutator 54 should be advanced two discrete positions and the fourth order decade commutator 56 should be advanced one discrete position.

To effectuate this corrective movement of the commutators, differentials 74 and 76 are operatively connected between the rotary elements 58 and 60, and between the rotary elements 60 and 62 respectively, and transmissions 78 and 80 are operatively connected to these differentials and to a transfer or intermittent drive mechanism operated by the highest order counter wheel 16. Consequently, as the numeral count passes through 9999 to 0000, the highest order counter wheel 16 generates a transfer to the differentials 74 and 76, respectively through the transmission 78 having a reversing 1:1 ratio, and through the transmission 80 having a direct 2:1 ratio. This transfer action is accomplished concomitantly with the advancement of the first octal rotary element 58 to its initial (1st) discrete position, such advancement ordinarily advancing the second octal rotary element 60 one discrete position forward. Instead, the transfer from the reversing transmission 78 enters the differential 74 to completely cancel the effect of the transfer from the first octal element 58. Thus, the first two octal commutators are at their initial discrete or binary zero (000,000) positions. At the same time the transfer generated from the counter indicator 16 is applied through the 2:1 ratio transmission 80 to the differential 76 to add two counts to the third order rotary element 62 thereby advancing the octal commutator 54 from its seventh discrete position through its eighth discrete position to its first or binary zero position. This generates a regular transfer to the decade commutator 56 to advance it to its binary zero position. The binary encoder is therefore corrected for advancement from binary zero as the counter moves from numeral 0000.

Figure 2:
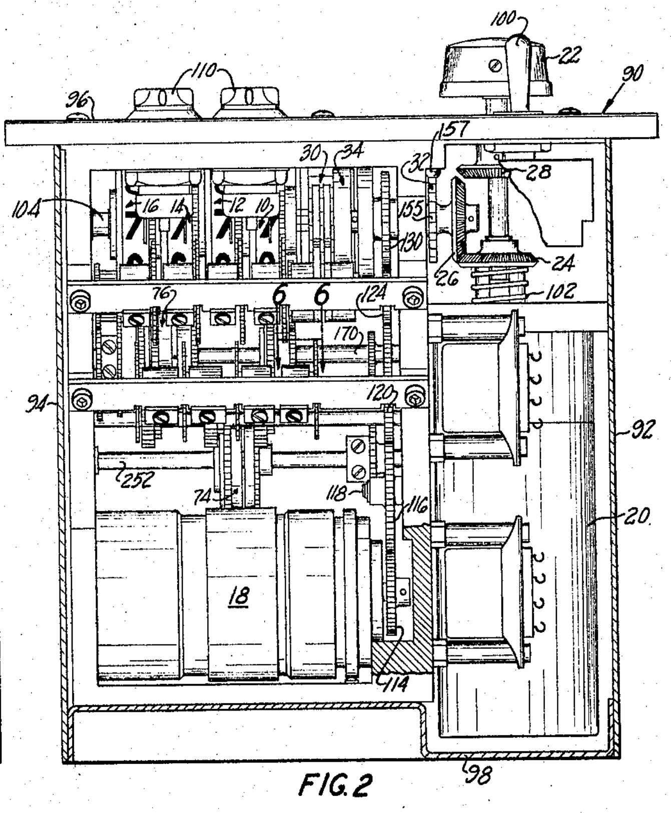
FIG. 2 is a bottom plan view partly broken away and partly in section of an embodiment of the encoding device diagrammed in FIG. 1.
Figure 5:
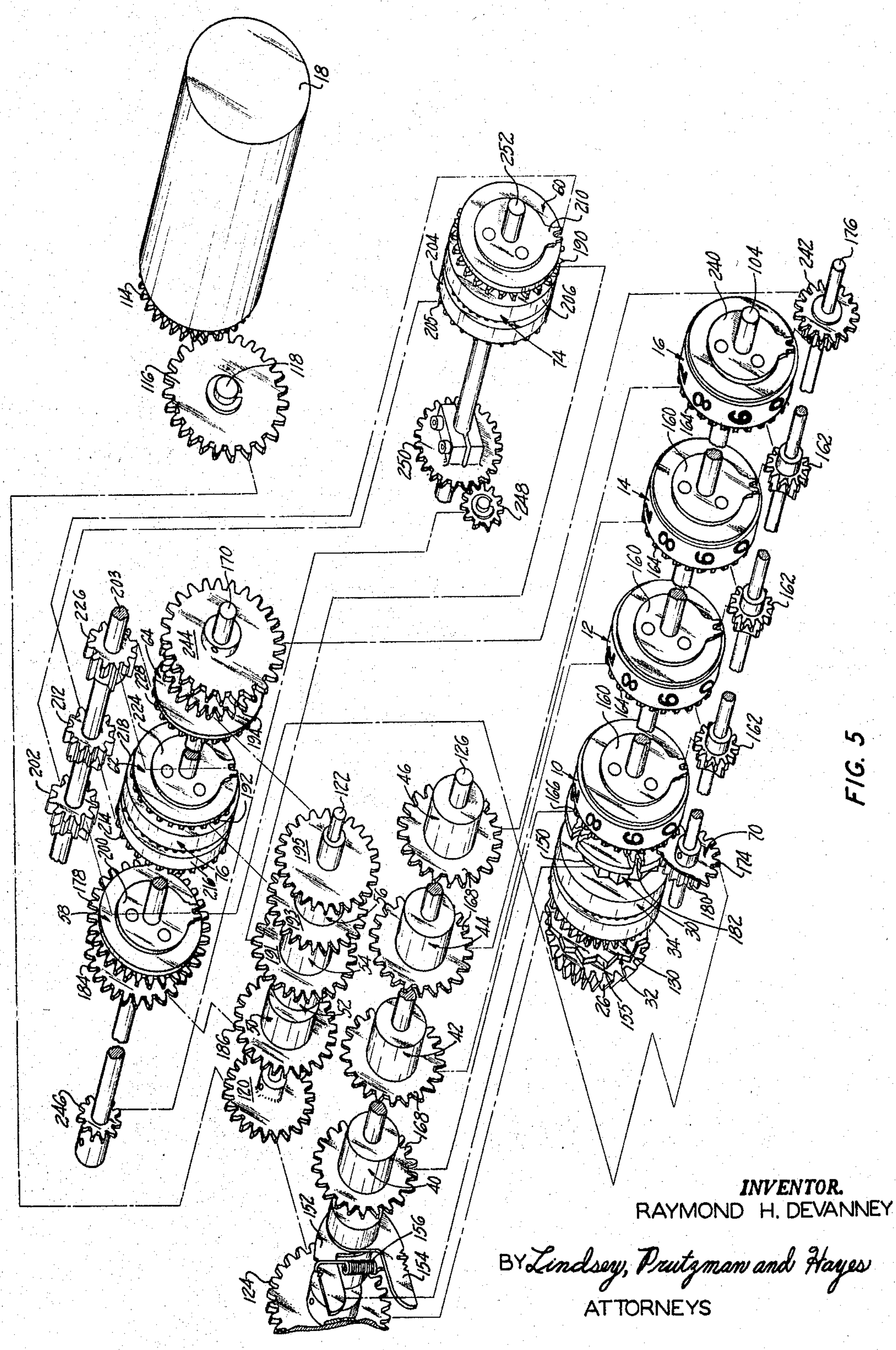
FIG. 5 is an exploded perspective view of some of the components of the encoding device of FIG. 2.

Referring to FIGS. 2–7 showing an embodiment of the diagrammed coding device of FIG. 1, a generally rectangular housing 90 having side walls 92 and 94 and front and rear walls 96 and 98, respectively, contains in a compact arrangement the parts of the coding device. As best seen in FIG. 2, the bi-directional slew motor 20 having a forward-reverse control switch 100 mounted on the front wall or cover 96, is positioned rearwardly within the housing with its axis extending forwardly for driving the bevel gear 24 biased by a spring 102 into engagement with the bevel gear 26. External of the cover 96 is the manual control knob 22 fixed to the bevel gear 28. By depressing the knob 22 the gears 24 and 28 are moved rearwardly against the spring 102 to engage the gear 28 with the gear 26 and disengage the gear 24, thereby enabling a manual slew control of the counter wheels with the knob 22.

Counter wheels 10, 12, 14 and 16 are rotatably mounted on a shaft 104 extending transversely within housing 90 to position the counter wheels adjacent the opening 108 in the housing cover for showing the visual readout of the counter. Light assemblies 110 are shown positioned on the cover 96 below the opening 108 to aid in reading the counter under reduced lighting conditions.

Rearwardly mounted within the housing 90 is the bi-directional stepping motor 18 with its axis extending transversely within the housing. This motor 18 is adapted to drive the counter through a gear train including the motor gear 114, a gear 116 on a stub shaft 118, a gear 120 fixed upon a shaft 122, a gear 124 fixed upon a shaft 126, and a gear 130 rotatively mounted on the counter shaft 104.

Figure 8:
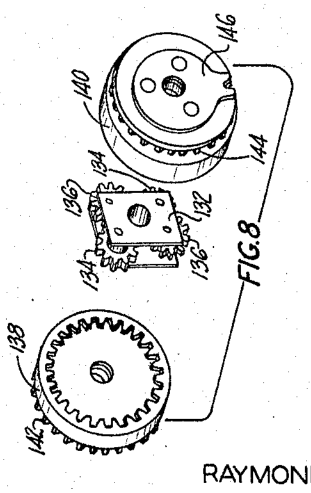
FIG. 8 is an exploded perspective view of a differential of the encoding device of FIG. 2.
Figure 4:
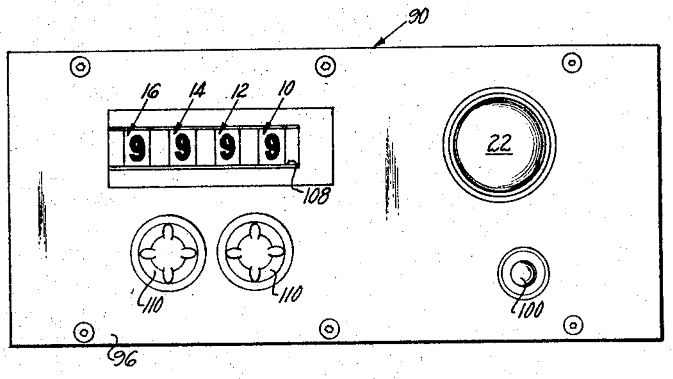
FIG. 4 is a front elevation view of the encoding device of FIG. 2.
Figure 3:
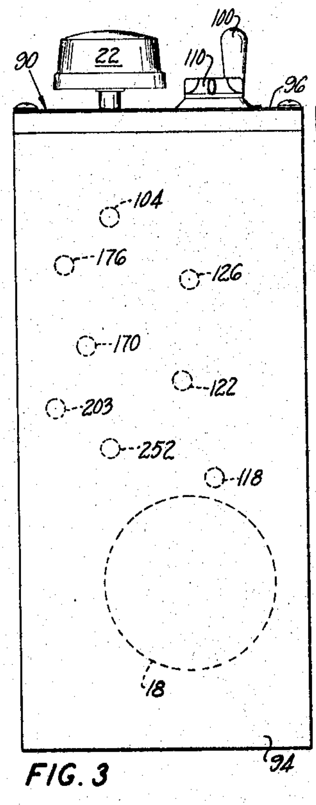
FIG. 3 is a left side elevation view of the encoding device of FIG. 2.

As heretofore mentioned, three differentials are used within the transmission of the coding device. These are the differential 34 connected to the stepping and slew motors and the differentials 74 and 76 connected to the rotary elements 58 and 60 and 60 and 62, respectively. An exploded perspective view of the differentials 74 and 76 is shown in FIG. 8, the differential 34 being similar thereto. These differentials have a carrier 132 with two pairs of intermeshing planetary gears 134 and 136 and sun gears 138 and 140 in driving engagement therewith, respectively. Fixed to the sun gears 138 and 140 for providing a driving connection therewith are the spur gears 142 and 144, respectively. Additionally, the sun gear 140 has fixed thereto a gear sector 146 for providing a transfer to the rotary elements 60 and 62.

The drive of the lowest order counter wheel 10 by the bi-directional stepping motor and the slew system is provided through the connection of the bevel gear 26 with the carrier of the differential 34 and by the connection of the spur gear 130 with a sun gear of the differential 34, the other sun gear of the differential being connected with the lowest order indicator wheel 10 of the counter. Consequently, the drive from the stepping motor and from the slew system can simultaneously or individually drive or position the rotary counter. The drive detent 30 comprises a detent wheel 150 connected to the lowest order indicator 10 and is engaged by a pair of relatively movable detent arms 152, 154 pivotally mounted upon the shaft 126 and biased by the spring 156 into engagement with the detent wheel 150. The detent 32 includes a detent wheel 155 connected to the bevel gear 26 and a spring biased ball detent 157. Between the counter wheels 10, 12, 14 and 16 are the conventional transfer mechanisms comprising transfer gear sectors 160 and gears 164 fixed to the rotary indicators and transfer pinions 162 rotatably mounted on the pinion shaft 176. In engagement with the gears 164 and with a gear 166 fixed to the lowest order wheel 10 are the gears 168 rotatively mounted on the shaft 126 and driving the commutators 40, 42, 44 and 46 of the binary decimal coded system.

The lowest order rotary element 58 rotatably mounted on a shaft 170 is driven in cooperation with the drive of the lowest order counter wheel 10 by a gear 174 fixed to the transfer pinion shaft 176 and engaging the gear 178 fixed to the rotary element 58. The gear 174 has an interrupted drive through a transfer pinion 180 connected thereto and driven by a transfer gear sector 182 connected for rotation with the lowest order counter wheel 10. Consequently, a transfer to the rotary element 58 is generated with the passage of every two indicia on the lowest order counter wheel 10. The lowest order commutator 50 rotatively mounted on the shaft 122 is indexed with the rotary element 58 through the intermeshing gears 184 and 186 connected to the rotary element 58 and the commutator 50, respectively. The remaining higher order commutators 52, 54, and 56 are driven through the interengaging pairs of gears 190 and 191, 192 and 193, and 194 and 195 respectively, the former gear of each pair being connected to the rotary elements 60, 62, and 64 respectively.

The commutator 52 is driven from the rotary element 58 through a transfer gear sector 200, a transfer pinion 202 rotatively mounted in the transfer pinion shaft 203, a sun gear 204 of the differential 74 connected to a gear 205, the differential planetary gears, and the other sun gear 206 of the differential which is connected to the rotary element 60. The drive to the commutator 54 from the rotary element 60 is through the transfer gear sector 210, transfer pinion 212, a gear 214 fixed to the sun gear 216 of the differential 76, the differential planetary gears, and the other sun gear 218 which is connected to the rotary element 62. The drive to the commutator 56 from the rotary element 62 is through the transfer gear sector 224, a transfer pinion 226 and a gear 228 connected to the rotary element 64.

The ratio of the teeth in the above-described drive between the lowest order rotary indicator 10 and the commutators 50, 52, and 54 and 56 are such that the commutators 50, 52 and 54 have eight discrete positions whereas, the commutator 56 has ten discrete positions, and transfers to higher order commutators are generated every complete revolution of the adjacent lower order commutator. During the normal drive of the commutators 52, 54 and 56, the carriers of the differentials 74 and 76 are stationary. However, as the counter wheels move through 9999 to 0000 a transfer from the highest order counter wheel 16 to the differential carriers is generated through a transfer gear sector 240, a transfer pinion 242, a gear 244 fixed to the shaft 170, a gear 246 also fixed to the shaft 170, a reversing idler gear 248, and a gear 250 fixed to the shaft 252. The carriers of the differentials 74 and 76 are fixed to the shafts 252 and 170 respectively and are therefore indexed as the highest order counter wheel 16 moves through 9 to 0. This carrier movement cancels the usual transfer to the rotary element 60 and generates a double transfer to the rotary element 62 for generating the usual transfer to the rotary element 64 thereby setting all of the commutators 50, 52, 54 and 56 at their binary zero positions for subsequent coordination with the movement of the counter from 0000.

Figure 6:
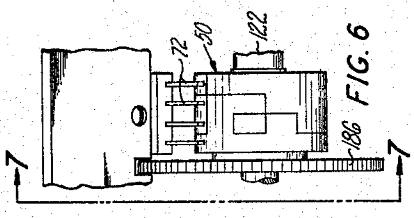
FIG. 6 is a section view taken along line 6—6 of FIG. 2.
Figure 7:
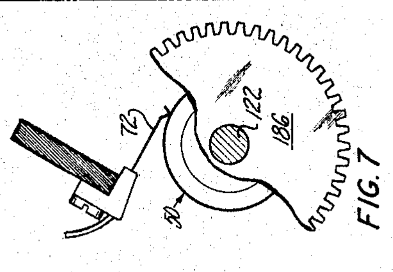
FIG. 7 is a section view partly broken away and partly in section taken along line 7—7 of FIG. 6.

Referring to FIGS. 6 and 7, the commutator 50 has in engagement therewith four axially spaced brushes 72. The outer surface of the commutator has a coated conductive surface contoured for providing a binary coded electrical output to the brushes, One of the brushes, shown to be the brush furthest to the right in FIG. 6, provides a common for energizing the conductive commutator surface and the remaining three brushes in accordance with a coded pattern are selectively energized as the commutator is indexed through its eight discrete positions to provide eight electrical codes corresponding to those positions. The highest order commutator 56, and the commutators 40, 42, 44 and 46 of the binary decimal code have five brushes in engagement therewith, with one brush providing the common and the remaining four brushes selectively energized to provide ten binary codes corresponding to the ten discrete positions of those commutators.

It can, therefore, be seen that the encoding device of this invention is capable of providing a program of electrical codes, such as binary codes, for a large quantity of data and mechanically correlate the codes and data through repetitions of the data. Further, the encoding device of the present invention has a highly compact and reliable arrangement of parts that are operable under adverse shock and vibrations.

As will be apparent to persons skilled in the art, various modifications and adaptations of the structure above described will become readily apparent without departure from the spirit and scope of the invention, the scope of which is defined in the appended claims.

I claim:

1. In a digital converter having a first rotary counting mechanism adapted to be advanced for counting through a digital sequence and electrical readout means for transmitting electrical signals for the digital sequence of the first rotary counting mechanism in accordance with the binary system; a control mechanism for resetting the first rotary counting mechanism to an initial position providing the initial count in the digital sequence upon advancement of the rotary counting mechanism through an intermediate position providing an intermediate count in the digital sequence comprising a second rotary counting mechanism connected for being advanced with the first rotary counting mechanism for counting in synchonism therewith, and intermittent drive means driven by the second rotary counting mechanism for resetting the first rotary counting mechanism to said initial position as the second rotary counting mechanism is advanced through its position which corresponds with said intermediate position of the first rotary counting mechanism.

2. The digital converter of claim 1 wherein said second rotary counting mechanism is adapted to count in the decimal system and to provide a decimal readout in synchronism with the electrical signals of the electrical readout means.

3. The digital converter of claim 1 wherein each of the rotary counting mechanisms comprises a plurality of rotary elements of increasing order and transfer means between the rotary elements and wherein the intermittent drive means is connected between the highest order rotary element of said second rotary counting mechanism and the transfer means of said first rotary counting mechanism.

4. The digital converter of claim 3 wherein the rotary elements of increasing order of the first rotary counting mechanism are adapted to be advanced for counting through a digital sequence in the straight binary system and the electrical readout means provides for transmitting electrical signals for the digital sequence in accordance with the straight binary system.

5. The digital converter of claim 3 wherein the intermittent drive means and the transfer means between the rotary elements of the first rotary counting mechanism comprise differential gear means between rotary elements of higher and lower order of the first rotary counting mechanism connected to be driven by the lower order rotary element and the second rotary counting mechanism.

6. A digital converter comprising a first rotary counting mechanism, electrical readout means for transmitting electrical signals in the binary system in accordance with the count of the first rotary counting mechanism, a second rotary counting mechanism connected to be advanced with the first rotary counting mechanism for counting in synchronism therewith, and intermittent drive means driven by one of the rotary counting mechanisms for resetting the other rotary counting mechanism to its lowest count as said one rotary counting mechanism is advanced through its maximum count to its minimum count.

7. A digital converter comprising a first rotary counting mechanism having a plurality of rotary elements of increasing order and transfer means therebetween, a second rotary counting mechanism having a plurality of rotary elements of increasing order and transfer means therebetween, drive means for advancing the counting mechanisms for counting in synchronism, electrical readout means for transmitting electrical signals in the straight binary system in accordance with the count of the first counting mechanism, and intermittent drive means driven by the highest order rotary element of one of the rotary counting mechanisms for resetting the other rotary counting mechanism to its minimum count upon advancement of said one rotary counting mechanism through its maximum count to its minimum count to maintain the electrical signals of the electrical readout means in synchronism with the count of the second rotary counting mechanism.

8. The digital converter of claim 7 wherein the intermittent drive and the transfer means of said other rotary counting mechanism include a differential having a first driving element operatively driven upon advancement of said one rotary counting mechanism through its maximum count to its minimum count, a driven element operatively driving one of the rotary elements of higher order of said other rotary counting mechanism, and a second driving element operatively driven by the adjacent lower order rotary element of said other rotary counting mechanism.

9. An encoding device for encoding a counter readout comprising, a readable rotary counting mechanism, first and second rotary elements of increasing order, drive means for rotatably advancing the lower order rotary element in synchronism with the advancement of the rotary counting mechanism from an initial discrete position corresponding to the minimum count of the rotary counting mechanism to successive discrete positions corresponding to succeeding counts of the rotary counting mechanism, first transfer means operatively connecting the rotary elements for advancing the higher order rotary element from an initial discrete position corresponding to the minimum count of the rotary counting mechanism to a plurality of successive discrete positions, electrical readout means providing electrical signals for the discrete positions of the rotary elements in accordance with the straight binary system, and second transfer means operatively connected for coordinate movement with the rotary counting mechanism for indexing at least one of the rotary elements to its initial discrete position upon advancement of the rotary counting mechanism through its maximum count to its minimum count to maintain the electrical signals of the electrical readout means in synchronism with the count of the rotary counting mechanism through successive counts of the rotary counting mechanism.

10. An encoding device for encoding a repeating sequence of discrete units of data with electrical signals comprising, first and second rotary elements of increasing order, first drive means advancing the lower order rotary element from an initial discrete position to successive discrete positions in synchronization with the sequence of discrete units of data, transfer means operatively connecting the first and second rotary elements for advancing the higher order rotary element from an initial discrete position to successive discrete positions, electrical readout means for transmitting electrical signals in accordance with the discrete positions of the rotary elements for providing an electrical readout for each discrete unit of data within the repeating sequence, and intermittent drive means operatively driven by the first drive means for indexing one of the rotary elements to its initial discrete position upon advancement of the lower order rotary element through a number of discrete positions equal to the number of discrete units of data within the sequence to maintain the electrical signals of the electrical readout means in synchronization with the discrete units of data through succeeding repetitions of the data.

11. The encoding device of claim 10 wherein the intermittent drive means includes a differential having a first driving element intermittently driven by the first drive means, a second driving element operatively driven upon the advancement of the lower order rotary element through a number of discrete positions equal to the number of discrete units of data within the sequence, and a driven element operatively driving said one rotary element.

12. An encoding device for encoding a repeating sequence of units of data into electrical signals comprising, a rotary element, first drive means for advancing the rotary element from an initial position to a plurality of successive positions in synchronization with the sequence of units of data, electrical readout means providing electrical signals for the positions of the rotary element in accordance with the straight binary system, and intermittent drive means driven by the first drive means, said intermittent drive means indexing the rotary element to its initial position upon advancement of the rotary element through a number of positions equal to the number of units of data within the sequence to maintain the electrical signals of the electrical readout means in synchronization with the units of data through succeeding repetitions of the data sequence.

13. A digital converter comprising a counter having a pair of rotary indicator wheels of higher and lower order and first transfer means operatively connecting the indicator wheels, first and second rotary elements, means rotatably advancing the first rotary element from an initial discrete position to successive discrete positions in synchronism with the advancement of the counter, second transfer means operatively connecting the rotary elements for advancing the second rotary element from an initial discrete position to successive discrete positions, electrical readout means providing electrical signals for the discrete positions of the rotary elements in accordance with the straight binary system, and third transfer means operatively connecting the indicator wheel of higher order and at least one of the rotary elements, said third transfer means indexing said one rotary element to its initial discrete position upon advancement of the counter through its maximum count to its minimum count to maintain the electrical signals of the electrical readout means in synchronism with the count of the counter through succeeding repetitions of the count.

14. An encoding device for encoding data with electrical signals in the straight binary and decimal binary systems comprising a first decimal counter having a plurality of rotary elements of increasing order with transfer means therebetween, first electrical readout means providing electrical signals for the count of the decimal counter in accordance with the decimal binary system, a second straight binary counter having a plurality of rotary elements of increasing order, drive means for advancing the lowest order rotary element of the straight binary counter from an initial discrete position corresponding to the minimum count of the decimal counter to successive discrete positions, said drive means advancing said lowest order rotary element in synchronism with the advancement of the decimal counter, transfer means operatively connecting the rotary elements of the straight binary counter for advancing the remaining rotary elements of the second counter from initial discrete positions corresponding to the minimum count of the decimal counter to a plurality of successive discrete positions, second electrical readout means providing electrical signals for the discrete positions of the straight binary counter in accordance with the straight binary system, and second drive means operatively driven by the decimal counter for indexing at least one of the rotary elements of the straight binary counter to its initial discrete position upon advancement of the decimal counter through its maximum count to its minimum count to maintain the electrical signals of the second electrical readout means in synchronism with the electrical signals of the first electrical readout means through successive counts of the decimal counter.

References Cited by the Examiner

UNITED STATES PATENTS

| | | | |
|---|---|---|---|
| 2,665,070 | 1/1954 | Avery | 235—155 |
| 2,733,008 | 1/1956 | D'Andrea | 235—92 |

OTHER REFERENCES

Pages 1109–1117, June 1956, "Practical Analog-Digital Converters," from "Instruments and Automation."

DARYL W. COOK, *Acting Primary Examiner.*

MALCOLM A. MORRISON, *Examiner.*

J. F. MILLER, *Assistant Examiner.*